United States Patent [19]

Spears

[11] Patent Number: 5,049,260

[45] Date of Patent: Sep. 17, 1991

[54] BLAST CLEANING WET MEDIA FEED AND SEPARATION SYSTEM

[76] Inventor: Richard L. Spears, P.O. Box 590, Seminole, Okla. 74868

[21] Appl. No.: 574,322

[22] Filed: Aug. 29, 1990

[51] Int. Cl.⁵ ............................................... B03B 7/00
[52] U.S. Cl. .......................................... 209/2; 51/425; 209/17; 209/157; 209/208
[58] Field of Search ...................... 209/2, 17, 155, 157, 209/158, 160, 208, 210; 51/425, 264

[56] References Cited

U.S. PATENT DOCUMENTS

| | | | |
|---|---|---|---|
| 981,230 | 1/1911 | Trottier | 209/157 |
| 1,441,571 | 1/1923 | France | 209/155 |
| 3,367,495 | 2/1968 | Lea et al. | 209/157 X |
| 4,012,316 | 3/1977 | Ostlund et al. | 209/17 X |
| 4,213,475 | 7/1980 | Minkin | 134/111 |
| 4,250,024 | 2/1981 | Soares et al. | 209/10 |

FOREIGN PATENT DOCUMENTS 0156660 6/1988 Japan ..................................... 51/425
0670981 7/1989 Switzerland ........................ 209/17

Primary Examiner—Donald I. Hajec
Attorney, Agent, or Firm—Robert K. Rhea

[57] ABSTRACT

A media particle size separating apparatus and method are disclosed for use with a slurry blast cabinet. The system is capable of continuous operation so that under sized blast media particles and fines can be separated out of the slurry along with debris from the blasting operation on a continuous basis. An upwardly open partition divided hopper receives spent slurry from the blasting cabinet to flow through at least two chambers in the hopper to a pump returning the slurry and sized media to the blasting cabinet and nozzles therein. Unusable fines collected in one chamber of the hopper are drawn off through a drain valve.

6 Claims, 3 Drawing Sheets

BLAST CLEANING WET MEDIA FEED AND SEPARATION SYSTEM

BACKGROUND OF THE INVENTION

1. Field of the invention

This invention relates to slurries used in blast cleaning, honing, vibratory finishing, and machining and more particularly to a system and apparatus for separating unwanted fine particles from liquid suspended particulate solids.

Wet media blast apparatus is used for deburring, abrading smoothing or surface coating of manufactured parts accomplished by a stream of high velocity liquid containing hard particles. These hard particles are generally referred to in the trade as "grit".

The blasting apparatus utilizes high pressure liquid jets to drive the grit against the surfaces being treated and for washing way residual grit from the parts and the apparatus.

It is necessary to separate excess liquid before reusing the grit and since this blasting treatment with grit removes and scraps off, from the treated part, small pieces, particles of metal, mold, core sands, dirt and so forth, such contaminates are in the liquid and hard core particles which drain from the blasting chamber.

Returning liquid containing the blasting grit also contains oils, colloidal particles, detergents, surface coating material of various kinds which are washed away in the drainback of the wet media.

Such contaminates complicate the separation problem since some of the contaminates have floatation effects which tend to carry oil in foam with valuable grit which desired for reuse.

Accordingly it is desirable that the wet media be collected as it falls from the article being treated for reconditioning and returning to the blasting pump which is accomplished by this invention.

2. Description of the prior art

Typical blasting operations are one hopper slurry systems that do not attempt to remove the spent media and contaminates. The liquid and media are agitated to avoid clogging the pumps and lines with excessive concentrations of media. On account of the required agitation, floatable contamination, such as oil, remains in the solution and can recoat the work. Only low concentrations are used because of inconsistent agitation and start up clogging problems. As a result of not separating spent media from the slurry, the finish produced on the workpiece is different at the beginning and at the end of a run. When a build up of fines becomes unbearable, the mixture is dumped. Low grit concentrations greatly extend the time for finishing. Under these conditions, finished consistency is impossible.

U.S. Pat. No. 4,250,024 discloses a blast bead separator in a blasting apparatus which continuously separates the broken and undesired beads from the reusable beads. This is accomplished by used slurry being withdrawn from a hopper at the bottom of the blasting cabinet, pumped to the top of the separator apparatus, consisting of screen of selected mesh, which delivers the reusable whole glass beads to a bin while the remainder or unused undesirable particles pass downward to another, finer screen, retaining all but the liquid slurry medium. The slurry medium or water passes to a holding tank which is returned to the reusable glass beads by a pump.

Most washers currently recycle the grit unintentionally for the reason their systems do not incorporate a means of grit removal. All washers utilize a flat bottom tank with a pump intake slightly off the tank bottom, when sludge builds up to the pump intake, pump performance is reduced and the unit is shut down to be cleaned out.

Most systems utilize a coarse screen to avoid plugging spray nozzles or damaging the pump.

U.S. Pat. No. 4,213,475 discloses using washed off soils to improve workpiece washing or cleaning operations in which dirt is collected and reused.

This invention is distinctive over the above and other patents by concentrating the usable grit in the bottom of the hopper where it can be regulated for a desired concentration in the liquid and return to the cleaning area so that the fines may be removed and not take up the space of larger effective cleaning grit.

SUMMARY OF THE INVENTION

This system provides a variable concentration of solids to liquid fed to a pump which reconcentrates the solids flowing to the pump for recycling by removing finer solids.

A typical example of the system is supplying a wet abrasive blasting system with a desired concentration of abrasive slurry to a pump. The pump conveys the slurry through a blasting device, as for example, an air blast nozzle or a centrifugal throwing wheel. Following the blasting action, the abrasive and liquid falls into a pool. Contaminates and spent abrasive fines are then separated from the usable abrasive which is concentrated in a container for reuse.

Agitation of the slurry tank is not required permitting floatable contaminates to separate easily and be removed. This feature makes possible a continuous blast clean and degrease process.

The principal objects of the invention are to provide a variable concentration of solids to liquid fed to a pump and reconcentrating the solids following the pump for recycling while removing finer solids and concentrating them in another area for removal which will achieve: consistent finishes on a workpiece as a result of consistent media sizing; longer use of media by eliminating the build up of fines; greater concentrations of media in the slurry to clean the workpiece quicker; providing a rinse operation of the media by shutting off the media flow and using liquid only; and, permitting controlled variation of fines settling and flotation separation to more accurately purify the overflow from the system so that a level probe or a make-up feeder can be utilized to automatically replenish the media.

DESCRIPTION OF THE PREFERRED EMBODIMENTS

Figure 1:
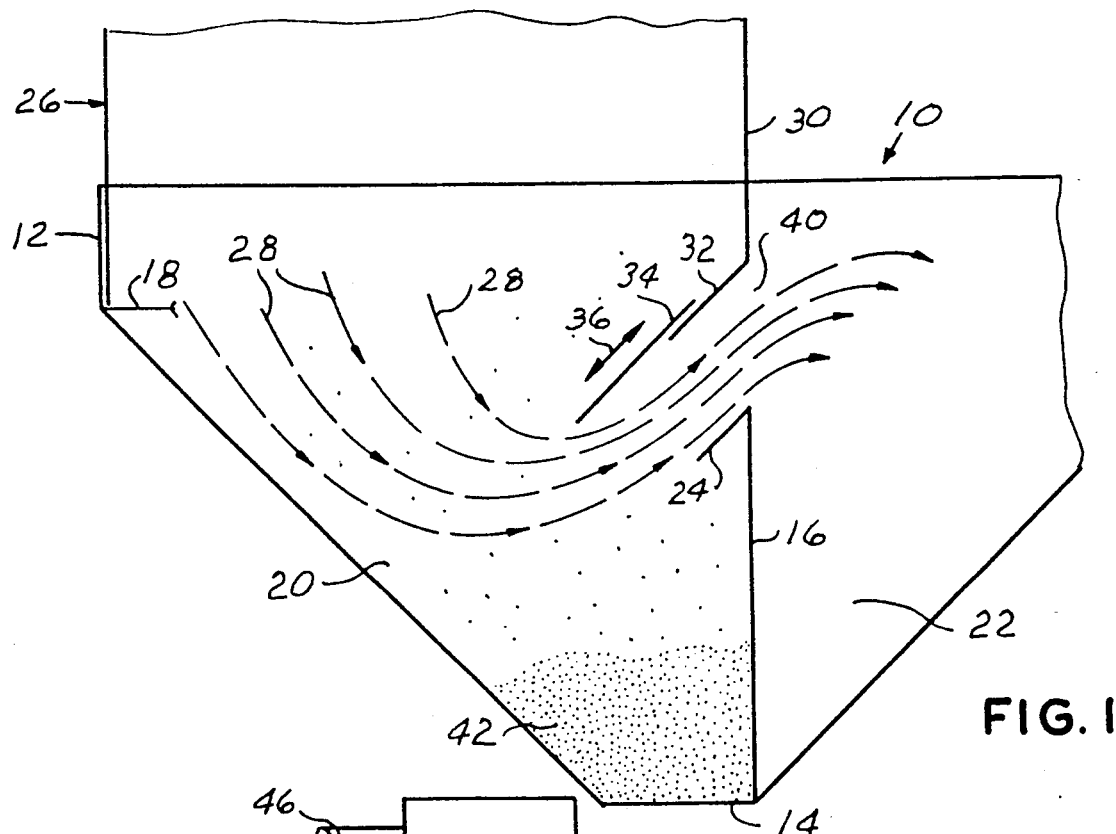
FIGS. 1 and 2 are mechanical diagrams of blast system media hoppers illustrating standard and precise separation, respectively, of media particle sizes.
Figure 2:
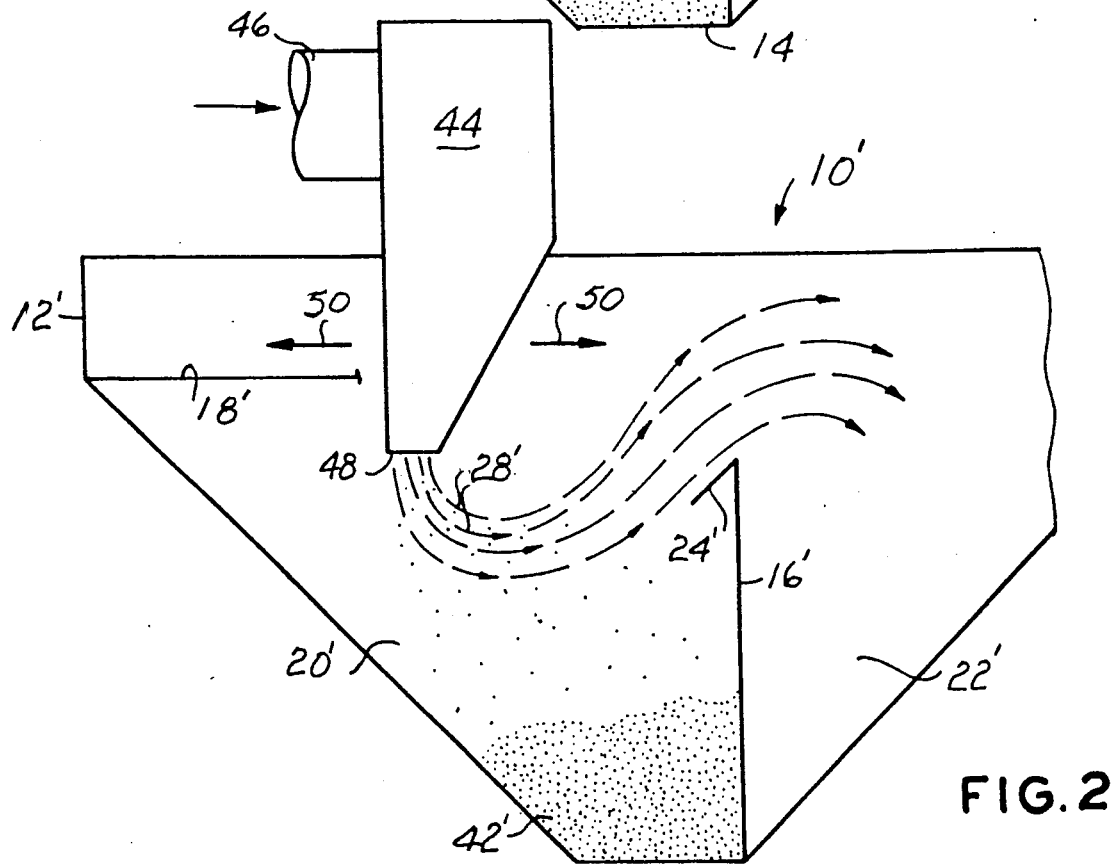

Like characters of reference designate like parts in those figures of the drawings in which they occur.

In the drawings:

Depending upon the desired finish to be produced on a workpiece by a wet media blasting system, three hopper media separating designs may be used including a fourth modified version providing a media wash system for using some of the removed soils which enhances a workpiece cleaning process.

STANDARD SEPARATION

Referring to FIG. 1, the numeral 10 indicates a media supply blast system hopper comprising an upwardly open container having the uppermost edge portion 12 of its side walls vertically disposed and converging downwardly therefrom to the respective edges of a relatively small horizontal flat bottom wall 14.

The hopper 10 is transversely divided by a partition 16 secured to the bottom 14 and opposite sloping walls of the hopper and terminates horizontally in downward spaced relation with respect to the horizontal plane, defined by the lower limit of the vertical walls 12 indicated by the line 18, thus forming a pair of media chambers 20 and 22.

The upper limit of the partition is provided with a downwardly inclined baffle 24 projecting a selected distance into the chamber 20.

A portion of the hopper 10 is disposed below and nests the depending wall edge portion of the workpiece blasting chamber 26 so that wet media utilized in cleaning a workpiece, not shown, in the blasting chamber 26 falls by gravity into the hopper 20 as indicated by the series of direction flow arrows 28.

The depending end portion of the blasting chamber wall 30 terminates in spaced vertically aligned relation above the hopper partition 16 and a portion thereof is inclined downwardly toward and into the hopper chamber 20, parallel with the partition baffle 24, to form a baffle 32 of selected width.

Additionally, a movable baffle 34 is disposed in partial overlapping relation with respect to the blast chamber wall baffle 32 for movement in the direction of the arrow 36 to length or decrease the throat 40 formed between the baffles 32, 34 and 24, through which the wet media must flow to enter the hopper chamber 22.

The hopper 10 is intended for use with a limited size range and type of media in workpiece blast cleaning processes where only general cleaning of the workpiece is required.

Media is added to the blast of liquid to remove tightly adhering contaminates from a workpiece. For efficient cleaning most of the removed contaminates and media fines should be separated from the reusable media before reuse.

The standard approach has been the hopper 10 which has an adjustable baffle, as stated above, which can lengthen or shorten the flow path over the separator partition 16 into the hopper chamber 22 to collect in or remove a greater range of sizes of the media in the storage area or chamber 20.

In the standard separation version illustrated by the hopper 10, the reusable media 42 falls out of the media stream 28 by gravity and collects in the bottom of the chamber 20 while the fines and unusable media flows with the media stream through the throat 40 into the chamber 22.

PRECISE SEPARATION

Some wet blast finishes on workpieces require that all of the contaminates and fines be removed from the media.

Some applications of wet blasting may also required the use of different sizes or types of media in the same equipment.

A precise media separator is a unit separate from the blast finishing enclosure and comprises a similar upwardly open hopper 10' similarly having an upstanding rectangular top edge portion wall 12' converging downwardly to a flat bottom wall 14'.

The hopper 10' is similarly provided with an upstanding partition 16' terminating downwardly with respect to the plane of the lower limit of the vertical walls 12', as indicated by the line 18', thus defining a pair of hopper chambers 20' and 22'.

The upper limit of the partition 16' is similarly provided with a baffle 24' projecting downwardly and into the chamber 20'.

The spent media or slurry is fed into a feed box 44 by a tube 46. At least one wall of the feed box 44 converges downwardly to form a relatively narrow exit opening of the feed box at its depending end 48 and form a narrow flow curtain 28' of the wet media as it leaves the feed box.

The wet media 28' flows in the direction of the flow stream arrows 28' through the chamber 20' and into the chamber, 22'.

The separator 10' functions not only by changing the direction of flow from downward-to-laterally-to-upwardly for dropping out, by gravity, larger media particles 42' in the chamber 20', but also utilizes the distance between the feed box 42 and the separating partition 16' by movement of the feed box 44 in either direction (toward or away from the partition 16'), as indicated by the direction arrows 50 which controls the flow rate of the stream 28' and the size of particles carried over the baffle 24' to the fines chamber 22'.

EXACT SEPARATION

Some workpiece blast cleaning processes require definitive media sizing which necessitates the use of wet screens.

Figure 3:
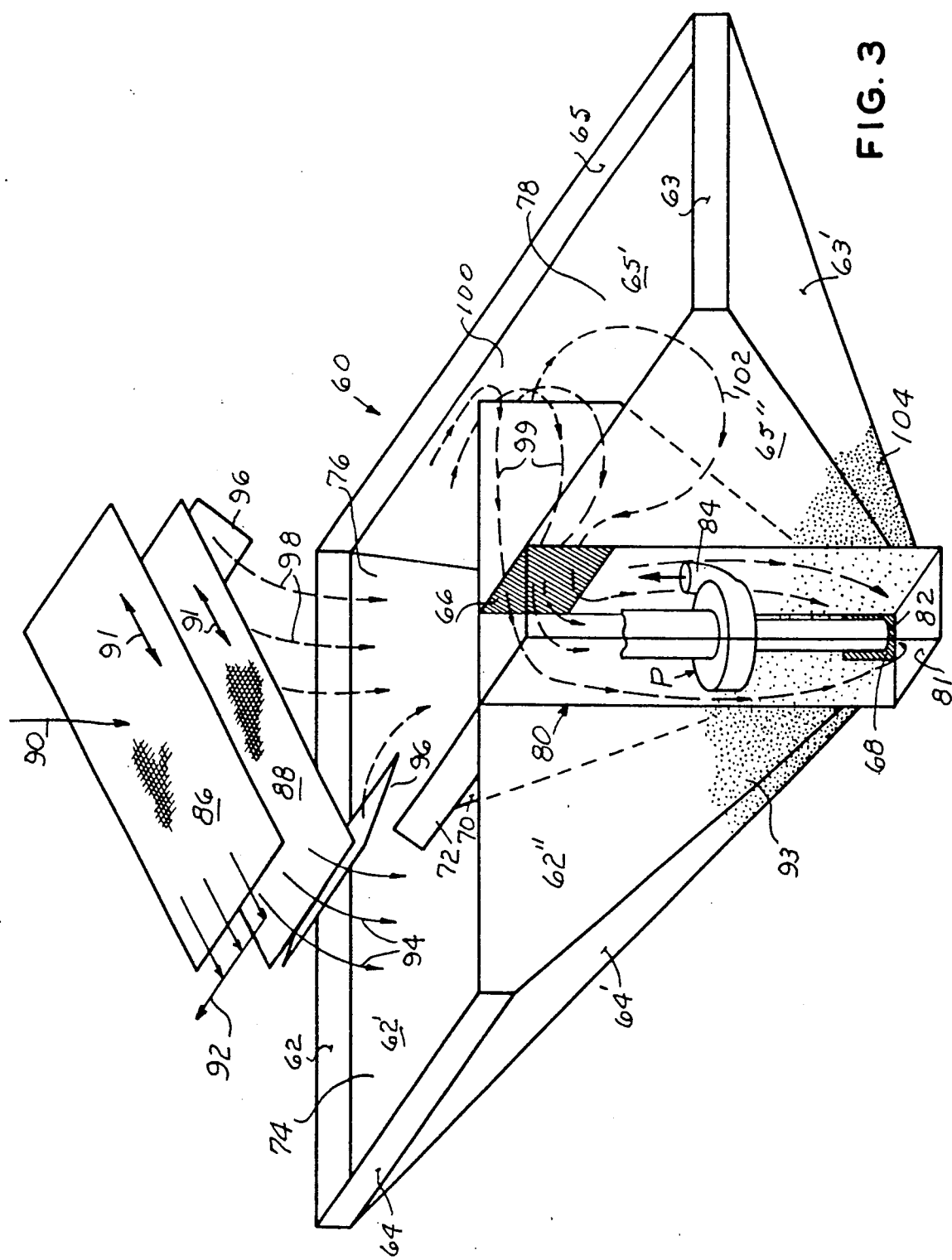
FIG. 3 is a perspective diagram illustrating exact separation of media particle sizes; and, FIG. 4 is a mechanical diagram.

Referring now to FIG. 3, an upwardly open hopper 60, similarly includes vertical end wall portions 62 and 63 and side walls 64 and 65 with the respective hopper walls, 62', 63', 64' and 65' converging downwardly from the respective vertically disposed wall portion toward the hopper bottom.

The partition/end wall 62" transversely substantially bisects the hopper medially the length of the upstanding side wall 64 and is vertically disposed, secured at its depending edges in water-tight relation with the converging side wall 64' and 65', respectively, with the end edge portion of the partition/end wall 62" terminating vertically in selected spaced relation with respect to the hopper upstanding side wall 65 for the reason presently explained.

Similarly, the hopper side wall 65" substantially longitudinally bisects the length of the hopper end wall 62 and has one downwardly converging edge rigidly joined to the converging end wall 63, with its opposite or vertically disposed edge secured in water-tight relation to the partition end wall 62".

At its juncture with the partition end wall 62', the edge portion of the side wall 65" is provided with a rectangular screened opening 66 for the purposes presently explained.

Similarly, the depending edge portion of the partition end wall 62" adjacent the side wall 65" is provided with a screened chamber 74 outlet or opening 68 for the reasons presently explained.

Similar to the hopper 10, a partition 70 and downwardly inclined attached baffle 72 divides the hopper walls 62' and 62" to define adjacent media chambers 74 and 76. The end portion of the partition end wall 62" extending beyond the vertical plane of the wall 65" toward the side wall 65 and inclined wall 65' similarly forms a fines chamber 78.

An elongated rectangular upright container 80 is disposed in the right angular corner formed by the partition end wall 62" and side wall 65" which communicates at its depending end with the media chamber 74 through the screened opening 68 and adjacent its upper limit with the fines media chamber 78 through the screen 66.

The chamber or container 80 houses a pump P having its inlet 82 adjacent the bottom 81 of the container 80 and its outlet 84 disposed in a upward direction.

A pair of vertically spaced superposed screens 86 and 88 are angularly disposed over the media chambers 74 and 76 in downwardly inclined parallel relation toward the chamber 74. The screens 86 and 88 are of selected mesh and are vibrated in the direction of the arrows 91.

Oversized particles falling with the liquid, the latter's volume being substantially reduced in this separation process, falls in the direction of the arrow 90 on the top screen 86 and are removed from the screen in the direction of the arrow 92.

Useable size media 93 passing through the screen mesh 86 falls on the lowermost screen 88 and into the hopper 74 in the direction of the arrows 94 and collects in the bottom of the chamber 74.

Liquid and unuseable particles or fines passing through the screen 88 are deflected at respective ends of the screen by plates 96 inclined downward toward the media chamber 76 and fall with the liquid in the direction of the fines and liquid arrows 98 into the hopper 76 where they flow around the end of the partition end wall 62" in the throat area 100 formed by the adjacent end of the partition 62" and the hopper side wall 65'.

The small sized particles flow, with the liquid, in the particles and liquid arrow path 99 through the screen 66 into the pump chamber 80. The liquid suspended fines move in a slower path, indicated by the looped arrows 102, so that the fines 104 settle out in the bottom of the chamber 78 and are removed in the manner described hereinafter in reference to FIG. 4.

The sized particles falling into the media chamber 74 enter the pump chamber 80 through the screen 68 to be picked up and discharged with the liquid and small particles in the flow stream 98 through the pump discharge 84.

WET MEDIA FEED AND SEPARATION

Figure 4:
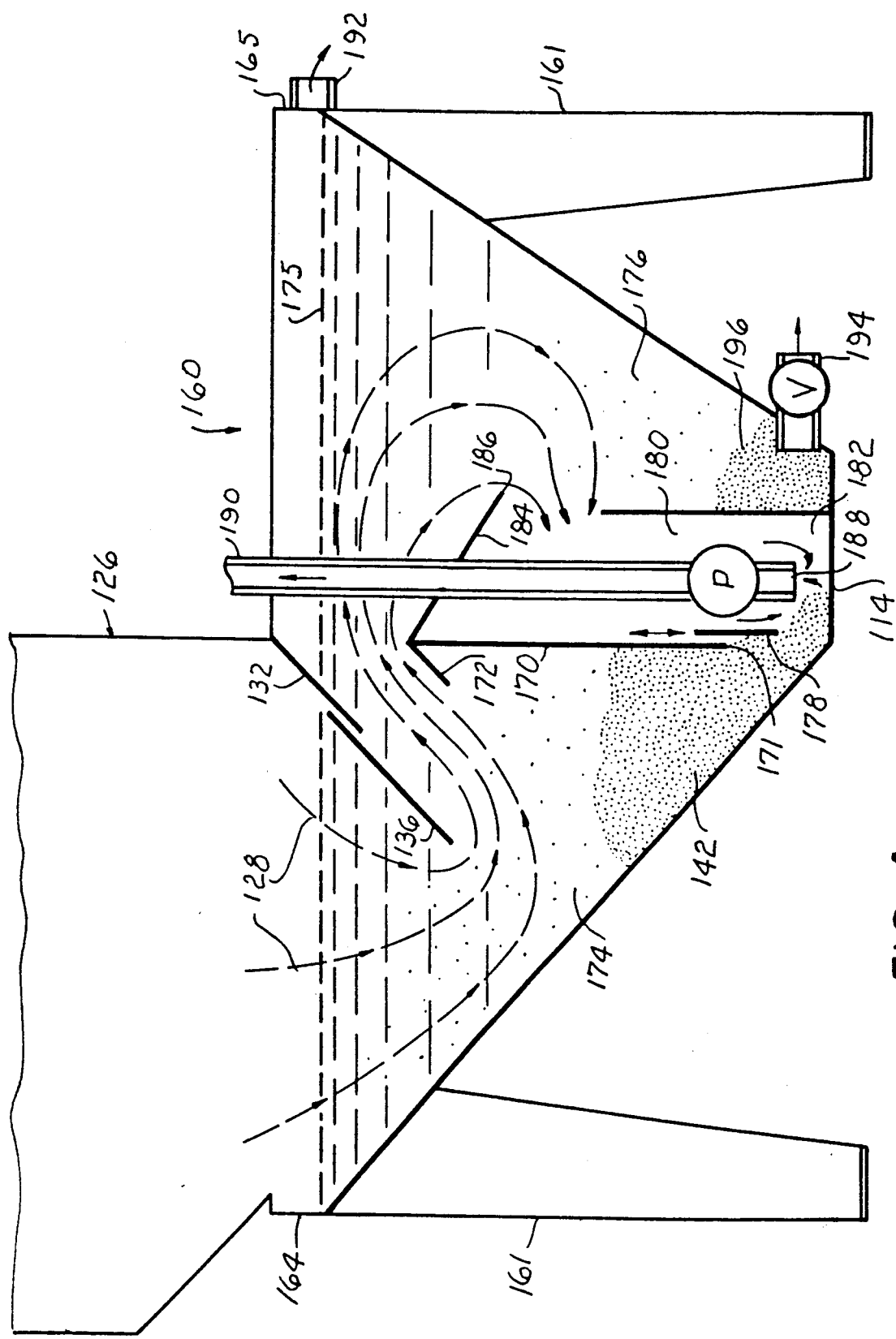

Referring now to FIG. 4, a hopper 160 having legs 161 is constructed similar to the hopper 60 of FIG. 3 including upstanding wall edge portions 164 and 165.

A partition 170 with a top baffle 172 extending downward to the left, as viewed in FIG. 4, divides the hopper to define media chambers 174 and 176. The depending edge of the partition 170 is disposed in vertically spaced relation with respect to the hopper bottom.

The chamber 174 opening formed between the depending edge 171 of the partition 170 and the hopper bottom 114 is opened and closed by a vertically adjustable partition door for the purposes presently explained.

The hopper 160 is further provided with a relatively low transverse partition 180 terminating upwardly in substantially medially the height of the partition 170 and parallel therewith forming a upwardly open pump chamber 182.

A second partition baffle 184 extends downwardly and toward the hopper chamber 176 from the upper limit of the partition 170 and interacts at its free edge portion 186. The vertical plane defined by the short partition 180 for the reasons believed presently apparent.

A pump P is disposed in the pump chamber 182 with its outlet tube 188 disposed in selected spaced relation at its depending end with the hopper bottom 114 and its outlet tube 190 projecting upwardly through the baffle 184 to the blasting nozzles, not show.

The hopper wall 165 is provided with a liquid level outlet tube 192 and the depending end portion of the chamber 176 is provided with a valve equipped outlet tube 194.

The workpiece blasting chamber 126 has the depending edge portions of its walls nested adjacent the inner surface of the hopper walls 164 and 165 with one wall of the blasting chamber having a downwardly inclined baffle 132 projecting into the media chamber 174 and similarly, an adjustable baffle 136 overlies the baffle 132.

The spent media in the form of a slurry falls by gravity into the hopper chamber 174 and flows in the direction of the arrows 128 through the hopper chamber 174 and upwardly through the throat area defined by the partition baffle 172 and the fixed and sliding baffles 132 and 136 into the hopper chamber 176.

Heavy particulate 142 falls by gravity out of the stream 128 and collects in the depending portion of the hopper chamber 174.

This separation is accomplished by a combination of gravity and the up flow of the stream through the throat. Any floatable contaminates are skimmed off the liquid level 175 through the hopper drain tube 192.

The abrasives in the flow stream pass through the hopper chamber 176 and into the pump chamber 182.

The fines 196 gravitate out of the stream and collect in the bottom of the chamber 176. The fines are periodically drawn off through the valve equipped drain 194.

The intake of the pump P receives liquid and media from the chamber 174 in accordance with the adjustment of the partition door 178.

SOIL UTILIZATION

In a workpiece spray washing or cleaning operation some of the dirt that is washed off the workpiece can be reused to enhance the washing operation by recycling the dirt with the wash water to generate a mechanical scrubbing action.

It is preferable in a workpiece washing operation to recirculate the wash water for cleaning the parts, however the fines should be removed from the reused dirt in the wash water for the reason the fines are of generally of micron size and are too small to effectively enhance the cleaning of a workpiece. Further they occupy the space of the reusable soil.

Further, the fines also reduce the flowability of usable soil, resulting in difficulties with the flow control of the wash water.

The hopper 160 can be utilized in such a washing operation in which the height of the dividing partition 170 is reduced so that any excess of the reusable dirt or soils can follow the flow path 128 into the fines chamber 176 to be removed through the draw-off or fines drain valve line 194.

Obviously the invention is susceptible to changes or alterations without defeating its practicability. Therefore, I do not wish to be confined to the preferred embodiment shown in the drawings and described herein.

I claim:

1. A particle size separating apparatus for use with wet slurry blasting at a blasting location where the used slurry containing some useable and some unuseable particles processed adjacent the blasting operation and returned to the blasting location, comprising:
   an upwardly open hopper having downwardly converging side walls joined to a horizontal bottom wall;
   transverse partition means extending upwardly from said bottom wall at least one half the height of said hopper for dividing said hopper and forming a plurality of slurry containing chambers,
   one said chamber being disposed below the blasting location for receiving used slurry by gravity; and,
   superposed baffle means coextensive between hopper opposing side walls and inclined downwardly from the vertical plane defined by said partition means into said one chamber for forming an upwardly directed slurry flow path from said one chamber to an adjacent chamber, thereby retarding the slurry flow rate through the baffle area flow path and allowing heavier reuseable slurry particles to settle-out by gravity in said one chamber.

2. The apparatus according to claim 1 in which one baffle of said baffle means is adjustable relative to the remaining baffle means toward and away from said one chamber for lengthening or shortening the slurry flow path between the baffle means.

3. The apparatus according to claim 1 and further including:
   screen means having a selected mesh interposed between the blasting location and the upwardly open hopper for exact size screening and separating the slurry particles.

4. The apparatus according to claim 2 and further including:
   screen means having a selected mesh interposed between the blasting location and the upwardly open hopper for exact size screening and separating the slurry particles.

5. The apparatus according to claim 4 and further including:
   pump means having an inlet disposed within the depending portion of said hopper and communicating with at least one chamber for returning slurry to the blasting location.

6. The apparatus according to claim 5 and further including:
   an opening formed in the depending limit of said partition means adjacent the upper surface of the hopper bottom wall; and,
   partition door means for permitting or occluding passage of slurry particles from said one chamber to the pump inlet.

* * * * *